(12) United States Patent
Furuyama et al.

(10) Patent No.: US 6,524,697 B1
(45) Date of Patent: Feb. 25, 2003

(54) TEMPERATURE SENSOR AND ELECTRONIC EQUIPMENT USING THE SAME

(75) Inventors: Shizuo Furuyama, Katano (JP); Koichi Morimoto, Sakai (JP); Yo Hasegawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/463,143

(22) PCT Filed: May 20, 1999

(86) PCT No.: PCT/JP99/02664

§ 371 (c)(1),
(2), (4) Date: Apr. 10, 2000

(87) PCT Pub. No.: WO99/61874

PCT Pub. Date: Dec. 2, 1999

(30) Foreign Application Priority Data

May 22, 1998 (JP) ............................................. 10-141102

(51) Int. Cl.[7] ................................................. G01K 7/16
(52) U.S. Cl. ....................... 428/328; 252/512; 252/514; 428/461; 428/463; 428/522; 524/439; 524/440; 526/245; 526/270; 526/273; 526/318.41; 526/329.5

(58) Field of Search ................................. 252/512, 514, 252/519.33; 524/439, 440; 526/270, 273, 245, 318.41, 329.5; 428/328, 463, 461, 522

(56) References Cited

FOREIGN PATENT DOCUMENTS

| JP | 3-132001 | 6/1991 |
| JP | 8-166295 | 6/1996 |

*Primary Examiner*—D. S. Nakarani
(74) *Attorney, Agent, or Firm*—McDermott, Will & Emery

(57) ABSTRACT

A temperature sensor for prevention of an overcurrent condition in circuits of electronic equipment such as personal computers. The temperature sensor including a temperature sensitive layer provided on opposing electrodes on an insulating substrate and prepared by suspending an electrically conductive powder in a mixture of a resin obtained by copolymerizing a flexible monomer, a hydrophobic monomer, and a monomer having a glycidyl radical, and a hardening agent; and an electronic equipment employing the temperature sensor.

24 Claims, 3 Drawing Sheets

TEMPERATURE SENSOR AND ELECTRONIC EQUIPMENT USING THE SAME

FIELD OF THE INVENTION

The present invention relates to a temperature sensor having a resistance value which changes in response to a temperature change and electronic equipment employing the sensor.

BACKGROUND OF THE INVENTION

In recent years, the use of thermistors and temperature sensors the resistance value of which suddenly increases at a specific temperature has been increasing in circuits of electronic equipment such as personal computers for the purpose of preventing an overcurrent condition. Similar temperature sensors are also used for the prevention of overheating damage due to short circuits in secondary batteries. As one of these temperature sensors for applications requiring a small and chip-shaped configuration for incorporation into a small electronic equipment, a temperature sensor employing a carbon-polyethylene composite as disclosed in U.S. Pat. No. 4,238,812 has been put into practical use.

When carbon is used as electrically conductive particles, application to a power supply circuit that requires a large current has been difficult because of its high specific resistance as compared with metals, and a sensor with a lower resistance value has been desired.

In addition, there has been a demand for a simple-to-manufacture, highly reliable, and low cost sensor.

To address the above foregoing issues, the present invention provides a temperature sensor having a low specific resistance, high reliability, and a low cost, and an electronic equipment using the temperature sensor.

SUMMARY OF THE INVENTION

The temperature sensor of the present invention includes a temperature sensitive layer in which an electrically conductive powder is suspended in a mixture of a resin obtained by copolymerizing a flexible monomer, a hydrophobic monomer, and a monomer having a glycidyl radical, and a hardening agent.

The temperature sensor of the present invention employs tetrahydrofurfuryl acrylate or methacrylate as the above-mentioned flexible monomer. Also, as the hydrophobic monomer, fluorine-containing acrylate or methacrylate is employed. Furthermore, it uses glycidyl acrylate or glycidyl methacrylate as the monomer having a glycidyl radical. As the hardening agent to harden the above copolymerized resin by heating, a hardening agent for epoxy resin is used. Also, as the electrically conductive powder to be suspended in the mixture of the above hardening agent, a metal powder is preferable. The preferable particle size of the electrically conductive powder is in the range of 1 to 10 μm.

By employing the above configuration, the temperature sensor in accordance with the present invention can be manufactured by a simple method of coating paint suspended with an electrically conductive powder on a substrate and subsequently hardening by heating. Also, the present invention provides a temperature sensor having a low resistance, superior temperature sensitivity, high reliability yet with a low cost. Furthermore, the temperature sensor of the present invention is suitable for miniaturization and implementation into chips lending itself to applications in a small electronic equipment.

In addition, the electronic equipment which uses the temperature sensor of the present invention can be made small, and its electronic circuit can be protected by a sudden increase of resistance value at a specific temperature.

DESCRIPTION OF THE PREFERRED EMBODIMENTS

First Exemplary Embodiment

Referring to the attached drawings, a description of the temperature sensor in a first exemplary embodiment of the present invention will be given in the following.

Figure 1:
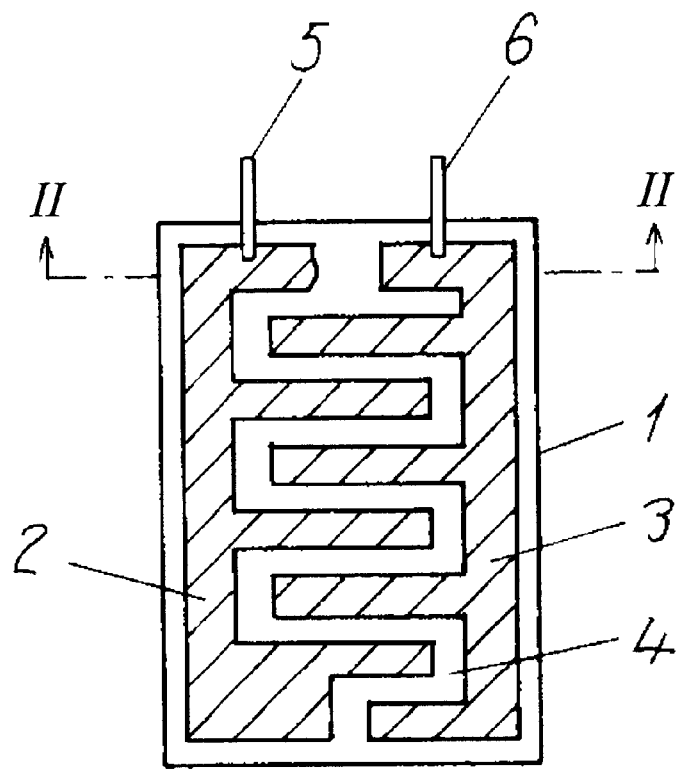
FIG. 1 is a plan view of a temperature sensor in a first exemplary embodiment of the present invention.
Figure 2:
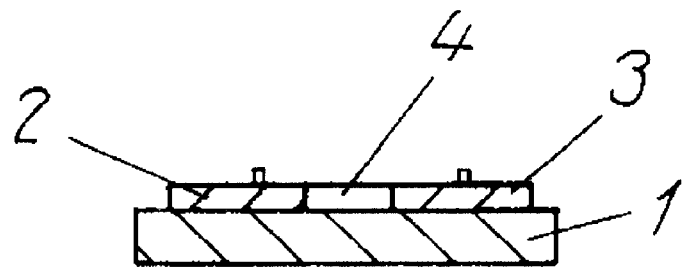
FIG. 2 is a cross-sectional view of FIG. 1 as cut along a broken line II—II.

FIG. 1 is a top view of the temperature sensor of this exemplary embodiment, and FIG. 2 is a cross-sectional view as cut along the broken line II—II of FIG. 1.

In FIG. 1 and FIG. 2, comb-shaped electrodes 2 and 3 made of silver are opposingly provided on an insulating substrate 1 made of ceramic or the like. A temperature sensitive film 4 is formed on insulating substrate 1 on which electrodes 2 and 3 have been formed. The temperature sensitive film 4 is formed by adding a hardening agent into a flexible polymer of the present invention and then suspending an electrically conductive powder in it. As shown in FIG. 1, the temperature sensitive film separates the electrodes 2 and 3. Leads 5 and 6 are connected with the electrodes 2 and 3.

As set forth above, by employing temperature sensitive film 4 prepared by suspending an electrically conductive powder in a flexible polymer, the expansion and shrinkage of the flexible polymer due to a temperature change is detected as a change in the contact resistance among the suspended electrically conductive powder particles, namely, a change in the electrical resistance.

The electrical conduction mechanism contains (1) a state at or below the glass transition temperature of the polymer in which a low resistance is maintained as the contact among suspended electrically conductive particles is dominant, and (2) a state in which the temperature has increased and exceeded the glass transition temperature, and the polymer expansion becomes large and the contact among electrically conductive particles decreases. When the temperature further increases beyond the glass transition temperature, the contact among electrically conductive particles decreases radically leading to a high resistance state. When the temperature returns to room temperature, the state of original contact is resumed due to shrinkage of the polymer thus returning to a low resistance state.

In order to satisfy such a characteristic, the binder system to be used for the temperature sensor of the present invention must have a glass transition temperature in the vicinity of 100 to 150° C. and the coefficient of expansion at or above the glass transition temperature must be at least twice that at the room temperature. Furthermore, needless to say, it must be superior in returning ability with a temperature decrease, and in the ease of suspending in electrically conductive particles and in adhesiveness to various types of substrates.

The present invention has been attained by the efforts of the present inventors in developing a flexible polymer which can satisfy these requirements. That is, a paint is prepared by suspending electrically conductive particles in a novel polymer obtained by copolymerization of tetrahydrofurfuryl (metha) acrylate, a monomer having a glycidyl radical and, if necessary, a fluorine-containing monomer, and adding a hardening agent for epoxy resin. By coating the paint on a substrate and subsequent hardening by heating, a temperature sensor with good reproducibility can be manufactured.

The present invention is a result of a study by the present inventors on temperature sensors having a combination of novel resin systems and electrically conductive particles in which the resistance value drastically increases in the temperature range 100 to 150° C. It has been found out that a novel epoxy resin obtained by copolymerization of tetrahydrofurfuryl (metha) acrylate and a vinyl monomer having an epoxy radical is suitable as the flexible resin for temperature sensitive film 4 as disclosed in Japanese Laid Open Patent No. Sho 62-22097. Furthermore, by using the above copolymer and a hardening agent for epoxy resin, it was found that temperature sensitive film 4 having a superior reproducibility can be obtained.

A distinctive feature of the temperature sensor of the present invention is that a temperature sensitive coated film is obtained by making a paint by adding a hardening agent and electrically conductive particles to a novel flexible resin, and subsequently coating on a substrate on which electrodes have been formed, drying, and hardening. According to this method of fabrication, it is possible to attain a small size and a low cost. Furthermore, if necessary, a fluorine-containing monomer may be copolymerized in order to enhance hydrophobic character.

As the monomer to be used in the present invention as a raw polymer material to obtain flexibility, tetrahydrofurfuryl (metha) acrylate can be used but tetrahydrofurfuryl methacrylate is preferable from the standpoint of copolymerizing capability. As the vinyl monomer having an epoxy radical, glycidyl (metha)acrylate or the like is suitable. As the fluorine-containing (metha)acrylate, a vinyl compound containing 2 to 5 fluorine atoms per molecule, preferably 3 to 4 atoms, is chosen. As the fluorine-containing compound, trifluoroethyl (metha)acrylate, tetrafluoropropyl (metha) acrylate, or pentafluoropropyl (metha) acrylate can be used.

In order to further enhance flexibility, it is possible to add other monomers, for example, aliphatic (metha)acrylate such as tetrahydrofurfuryl (metha)acrylate, 2-ethylhexyl (metha)acrylate, lauryl (metha)acrylate, or tridecyl (metha) acrylate. As the hardening agent, basically any hardening agent for epoxy resin can be used, though aromatic diamines, for example 4,4'-diaminodiphenyl methane, aliphatic diamines, for example, 1,12-diaminododecane, are preferable. Furthermore, aromatic diamines and aliphatic diamines may be concurrently used.

As the electrically conductive powder, metal powder such as silver powder or copper power, and their mixture can be used. The particle size is in the range of 1 to 10 µm, spherical particles 3 to 5 µm in size being specifically preferable. When the particle size is 1 µm or below, viscosity of the paste increases and causes problems in printing capability. Also, when the size is 10 µm or above, the metal portion precipitates during storage of the paste, causing possible dispersion in the characteristics. For the sake of reproducibility of the resistance value, flaky powder or dendritic powder may also be added. In view of the appropriateness for printing, spherical particles with 3–5 µm particle size is preferable.

The added amount of the electrically conductive particle is chosen from the range of 30–50 volume % of the amount of the resin, and is determined taking the desired resistance value, its rate of change with temperature, and the returning ability. When an optimum value is exceeded, the rate of change decreases, while the initial resistance value increases when the added amount is small and the returning ability with a temperature change worsens. The temperature sensor of the present invention is manufactured by laminating on comb-shaped electrodes 2 and 3 provided in advance on an insulating substrate 1 a paste prepared by adding a resin of the above composition, electrically conductive particles, a hardening agent, and a minimum required quantity of a solvent and thoroughly suspending and hardening by heating. As electrodes 2 and 3 of the temperature sensor thus obtained, an electrically conductive paste and ordinary electrode materials can be used.

The present invention will be further described in the following referring to practical exemplary embodiments.

EXAMPLE 1

A polymer solution was prepared by dissolving 62.48 grams of tetrahydrofurfuryl acrylate, 8.54 grams of glycidyl methacrylate, and 0.5 grams of azobisisobutyronitrile (AIBN) as the polymerization initializing agent into 106.5 grams of cyclohexanone, and subsequently copolymerizing by heating in a nitrogen flow at 80° C. for 5 hours. A quantity of 8 grams of spherical silver particles (average particle size of 3–4 µm) as electrically conductive particles and 0.2 gram of 4,4'-diamino-diphenyl methane (DDM) were added into 4.5 grams of the resin solution (concentration of solid component being 40% by weight) and fully mixed. A paste was obtained by subsequently thoroughly kneading and suspending with a three roll mill. A temperature sensor was fabricated by coating the obtained paste on an insulating ceramic substrate on which comb-shaped silver electrodes as illustrated in FIG. 1 had been formed, and hardening by heating at 150° C. for 1 hour.

Figure 3:
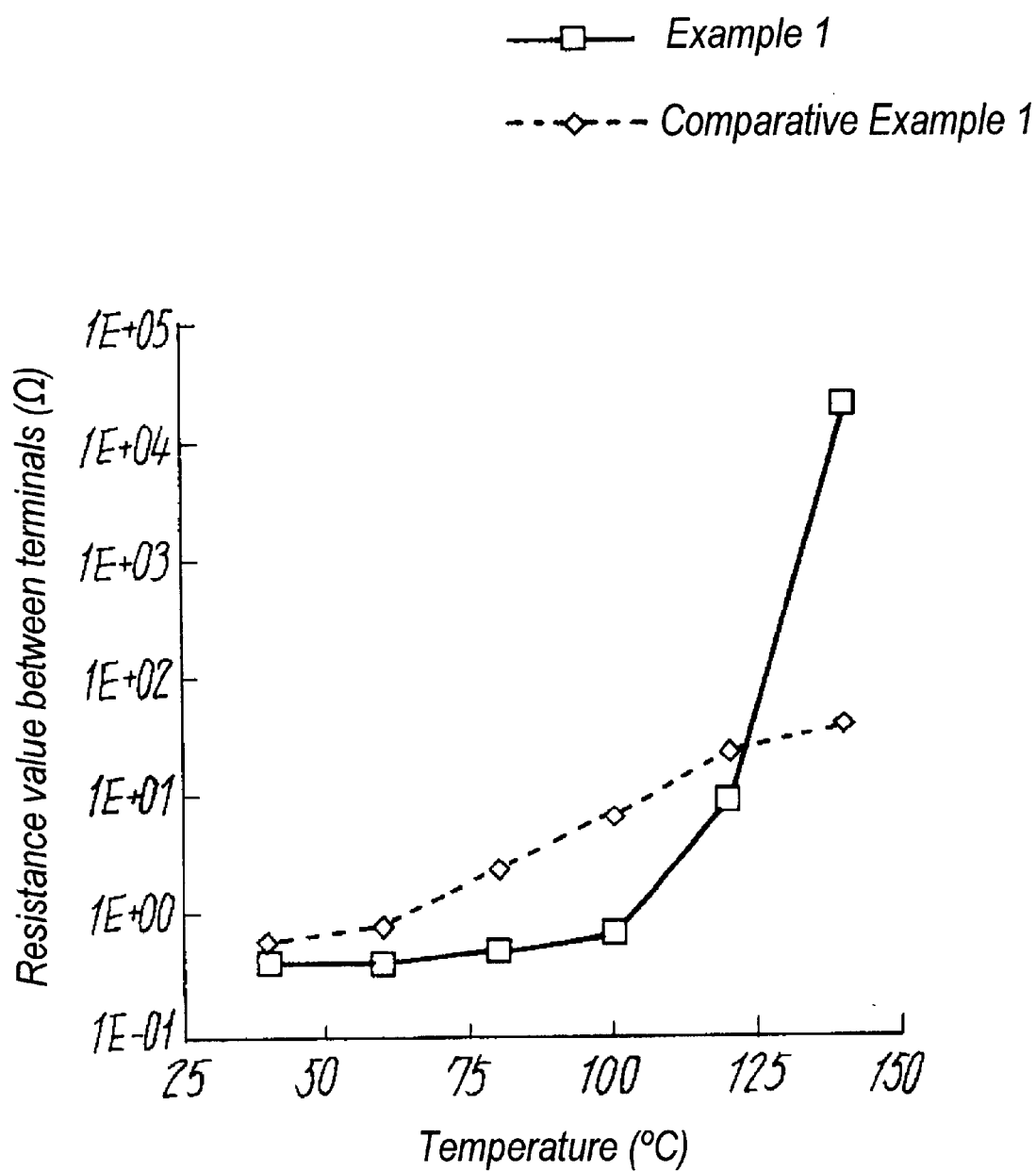
FIG. 3 is a graphical representation of the temperature characteristics of the temperature sensor in the first exemplary embodiment.

FIG. 3 is a graphical representation of the temperature sensing characteristics of the temperature sensor. The horizontal axis shows the temperature and the vertical axis shows the resistance value between terminals. The curve A shows the temperature sensing characteristics of Example 1.

Comparative Example 1

A quantity of 1.25 grams of Epicoat 806 (name of a product by Yuka-Shell Epoxy Co., Ltd.) as the epoxy resin, 0.75 grams of DDM as the hardener, and 8 grams of spherical silver particles (average particle size of 3–4 µm) as electrically conductive particles were added together and fully mixed. After kneading and suspending the mixture with a three roll mill, a temperature sensor was fabricated in the same manner as in Example 1. In doing this, coating was performed so that the film thickness became almost equal. The curve B in FIG. 3 shows the temperature sensing characteristics of Comparative Example 1.

EXAMPLE 2

A polymer solution was obtained by dissolving 57.87 grams of tetrahydrofurfuryl methacrylate, 11.16 grams of tetrafluoroethyl methacrylate, 8.54 grams of glycidyl methacrylate, and 0.58 grams of AIBN as a polymerization initializing agent into 77.57 grams of cyclohexanone, and copolymerizing by heating in a nitrogen flow at 80° C. for 5 hours.

To 2.98 grams of this resin solution (concentration of solid component being 50% by weight), 8.3 grams of spherical silver particles (average particle size of 3–4 μm), 0.21 grams of DDM, and 0.8 gram of benzyl alcohol as a solvent were added together and fully mixed. Subsequently, the mixture was thoroughly kneaded and suspended to make a paste. A temperature sensor was fabricated by using the paste in the same manner as in Example 1.

In order to observe the resistance value change due to moisture absorption of the fabricated temperature sensor, the sensor was left standing for 24 hours in a chamber of 95% relative humidity, and the rate of increase in resistance value was evaluated to be 1%.

Comparative Example 2

A polymer solution was obtained by dissolving 68.08 grams of tetrahydrofurfuryl methacrylate, 8.54 grams of glycidyl methacrylate, and 0.58 grams of AIBN as a polymerization initializing agent into 76.62 grams of cyclohexanone, and copolymerizing by heating in a nitrogen flow at 80° C. for 5 hours.

Using this resin solution (concentration of solid component being 50% by weight), a temperature sensor was fabricated in the same manner as in Example 2. The rate of resistance value change due to moisture absorption of the temperature sensor was 3%.

From FIG. 3, it is evident that the rate of resistance value change with temperature of the temperature sensor of Example 1 is markedly superior to that of Comparative Example 1. This is attributable to the difference in the flexible polymers. Furthermore, in Example 2, as fluorine atoms are contained in the polymer molecules, moisture absorbing tendency is made smaller than in Comparative Example 2 thus resulting in a smaller increase in the resistance value.

As has been described above, the temperature sensor of the present invention is a unique temperature sensor in that it is superior in the temperature sensing performance and reliability and that it can be manufactured by printing.

Though the evaluation of the characteristics of the present invention was performed on a film coated on comb-shaped electrodes, an effect similar to Example 1 was obtained in a sandwiched configuration in which the paste of the Example 1 had been coated on a substrate on which a planar electrode had had been formed in advance, and a silver paste had been further coated on top of the above paste. Furthermore, while FIG. 1 illustrates a configuration having leads, a chip-form configuration without leads can also be implemented through which a temperature sensor which is small and adaptable to chip implementation suitable for incorporation into small electronic equipment can be obtained.

Second Exemplary Embodiment

Figure 4:
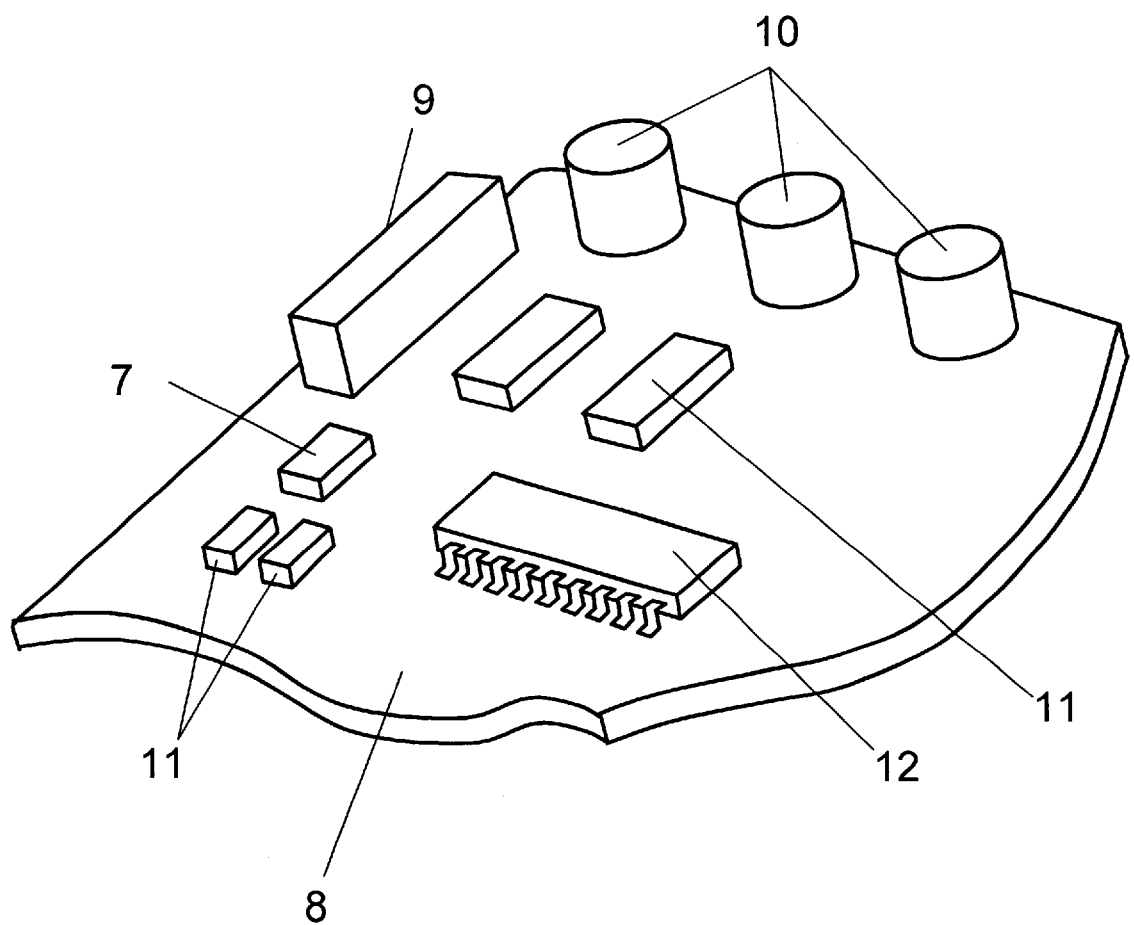
FIG. 4 is a schematic perspective view of a main board of a personal computer on which a temperature sensor of the present invention is mounted.

As schematically illustrated in FIG. 4, a temperature sensor 7 of the present invention is put to use after being mounted adjacently to a connector 9 provided on a personal computer main board 8 together with electronic components such as capacitors 10, resistors 11, and a memory 12. In this arrangement, the function of the temperature sensor is to protect the computer circuit from short-circuit or an overcurrent condition in the event an inadequate terminal equipment is connected to the connector. As the temperature sensor of the present invention is of a configuration in which a temperature sensitive film has been formed on a heat-resistant substrate, it has an added effect of withstanding the high temperature to be experienced while being soldered during the process of mounting on the substrate.

In the meantime, in this exemplary embodiment, while a description has been made of an example of being mounted on main board 8 of a personal computer, the temperature sensor of the present invention can of course be used for circuit protection in electronic equipment in general as well.
Industrial Applicability As set forth above, the temperature sensor of the present invention is for protection of electronic circuits by a sudden increase in the resistance value at a specific temperature. It is a temperature sensor having a low resistance, superior temperature sensing capability and high reliability, and is low in cost. It is also suitable for miniaturization and chip-form implementation for incorporation into small electronic equipment. The temperature sensor of the present invention can be used for prevention of an overcurrent condition in circuits of electronic equipment such as personal computers. Furthermore, because of its advantage of having a low resistance, the temperature sensor of the present invention can also be used in preventing overheat damage of secondary batteries due to short-circuiting.

What is claimed is:

1. A temperature sensor comprising a temperature sensitive layer, said temperature sensitive layer being obtained by suspending an electrically conductive powder in a mixture of a hardening agent and a resin, said resin obtained by copolymerizing i) a first monomer selected from the group consisting of tetrahydrofurfuryl acrylate and tetrahydrofurfuryl methacrylate, ii) a second hydrophobic monomer, and iii) a third monomer having a glycidyl group selected from the group consisting of glycidyl acrylate and glycidyl methacrylate, wherein said temperature sensitive layer has a glass transition temperature of about 100° C. to about 150° C. and a coefficient of expansion at or above the glass transition temperature, the coefficient of expansion at or above the glass transition temperature being at least twice the coefficient of expansion at room temperature.

2. The temperature sensor of claim 1, wherein said first monomer is tetrahydrofurfuryl acrylate.

3. The temperature sensor of claim 1, wherein said hydrophobic monomer is fluoroalkyl acrylate or fluoroalkyl methacrylate.

4. The temperature sensor of claim 3, wherein said hydrophobic monomer comprises 2 to 5 fluorine atoms per molecule.

5. The temperature sensor of claim 1, wherein said third monomer is glycidyl acrylate.

6. The temperature sensor of claim 5, wherein said hardening agent comprises at least one aromatic diamine or aliphatic diamine.

7. The temperature sensor of claim 1, wherein said hardening agent is a hardening agent for said resin comprising said third monomer.

8. The temperature sensor of claim 1, wherein said electrically conductive powder is a metal powder.

9. The temperature sensor of claim 8, wherein particle size of said electrically conductive powder is in the range 1 to 10 μm.

10. The temperature sensor of claim 8, wherein particles forming said electrically conductive powder have a spherical shape and a size in the range of 3 to 5 μm.

11. The temperature sensor of claim 1, wherein said first monomer is tetrahydrofurfuryl methacrylate.

12. The temperature sensor of claim 1, wherein said third monomer is glycidyl methacrylate.

13. An electronic device including a temperature sensor having a temperature sensitive layer, said temperature sensitive layer being obtained by suspending an electrically conductive powder in a mixture of a hardening agent and a resin, said resin obtained by copolymerizing i) a first monomer selected from the group consisting of tetrahydrofurfuryl acrylate and tetrahydrofurfuryl methacrylate, ii) a second hydrophobic monomer, and iii) a third monomer having a glycidyl group selected from the group consisting of glycidyl acrylate and glycidyl methacrylate, wherein said temperature sensitive layer has a glass transition temperature of about 100° C. to about 150° C. and a coefficient of expansion at or above the glass transition temperature, the coefficient of expansion at or above the glass transition temperature being at least twice the coefficient of expansion at room temperature.

14. The electronic device of claim 13, wherein said first monomer is tetrahydrofurfuryl arylate.

15. The electronic device of claim 13, wherein said hydrophobic monomer is fluoroalkyl acrylate or fluoroalkyl methacrylate.

16. The electronic device of claim 15, wherein said hydrophobic monomer comprises 2 to 5 fluorine atoms per molecule.

17. The electronic device of claim 13, wherein said third monomer is glycidyl acrylate.

18. The electronic device of claim 17, wherein said hardening agent comprises at least one aromatic diamine or one aliphatic diamine.

19. The electronic device of claim 13, wherein said hardening agent is a hardening agent for said resin comprising said third monomer.

20. The electronic device of claim 13, wherein said electrically conductive powder is a metal powder.

21. The electronic device of claim 20, wherein particle size of said electrically conductive powder is in the range 1 to 10 $\mu$m.

22. The electronic device of claim 20, wherein particles forming said electrically conductive powder have a spherical shape and a size in the range of 3 to 5 $\mu$m.

23. The electronic device of claim 13, wherein said first monomer is tetrahydrofurfuryl methacrylate.

24. The electronic device of claim 13, wherein said third monomer is glycidyl methacrylate.

* * * * *